US008457575B2

(12) United States Patent
Harrison et al.

(10) Patent No.: US 8,457,575 B2

(45) Date of Patent: Jun. 4, 2013

(54) OBTAINING AND PRESENTING METADATA RELATED TO A RADIO BROADCAST

(75) Inventors: Joshua C. Harrison, Kirkland, WA (US); Megan L. Tedesco, Sammamish, WA (US); Bruno C. Silva, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 12/238,949

(22) Filed: Sep. 26, 2008

(65) Prior Publication Data

US 2010/0081404 A1 Apr. 1, 2010

(51) Int. Cl.
*H04B 1/18* (2006.01)

(52) U.S. Cl.
USPC .... 455/186.1; 455/3.03; 455/3.06; 455/552.1

(58) Field of Classification Search
USPC ...................................................... 455/186.1
See application file for complete search history.

(56) References Cited

U.S. PATENT DOCUMENTS

| | | | |
|---|---|---|---|
| 5,761,606 | A | 6/1998 | Wolzien |
| 5,774,664 | A | 6/1998 | Hidary et al. |
| 5,778,181 | A | 7/1998 | Hidary et al. |
| 5,818,441 | A | 10/1998 | Throckmorton et al. |
| 5,818,935 | A | 10/1998 | Maa |
| 5,832,223 | A | 11/1998 | Hara et al. |
| 5,929,849 | A | 7/1999 | Kikinis |
| 6,018,768 | A | 1/2000 | Ullman et al. |
| 6,061,719 | A | 5/2000 | Bendinelli et al. |
| 6,098,106 | A | 8/2000 | Philyaw et al. |
| 6,317,784 | B1 | 11/2001 | Mackintosh et al. |
| 6,349,329 | B1 | 2/2002 | Mackintosh et al. |
| 6,658,232 | B1 | 12/2003 | Johnson |
| 6,990,312 | B1 | 1/2006 | Gioscia et al. |
| 7,010,263 | B1 | 3/2006 | Patsiokas |
| 7,190,971 | B1 | 3/2007 | Kawamoto |
| 7,551,889 | B2 * | 6/2009 | Quelle ......................... 455/3.06 |
| 7,580,325 | B2 * | 8/2009 | Welk et al. ................. 369/30.06 |
| 2002/0073179 | A1 | 6/2002 | Mackintosh et al. |
| 2004/0049389 | A1 * | 3/2004 | Marko et al. .................. 704/260 |
| 2005/0198193 | A1 | 9/2005 | Halme |
| 2005/0286481 | A1 | 12/2005 | Fadell |

(Continued)

OTHER PUBLICATIONS

"Enhanced Content Specification: Advanced Television Enhancement Forum (ATVEF)," <http://web.archive.org/web/20000817083738/www.atvef.com/library/spec1_1a.html>,Sep. 1998, Access date May 27, 2010, 28 pages.

(Continued)

*Primary Examiner* — Ajibola Akinyemi
(74) *Attorney, Agent, or Firm* — Alleman Hall McCoy Russell & Tuttle LLP

(57) ABSTRACT

A system and method for presenting content related to a radio broadcast are provided. The system may include a radio device having a receiver configured to receive a radio signal including an audio component and digitally encoded data associated with the audio component. The radio device may further include a decoder configured to decode the digitally encoded data from the radio signal. The radio device may further include a processor configured to receive the digitally encoded data from the decoder, extract a data parameter from the digitally encoded data, send a search query including the data parameter to a content service, and receive from the content service metadata associated with the data parameter. The system may further include a display configured to display the metadata received from the content service.

11 Claims, 3 Drawing Sheets

U.S. PATENT DOCUMENTS

| | | | | |
|---|---|---|---|---|
| 2006/0010472 | A1 | 1/2006 | Godeny | |
| 2006/0020609 | A1 * | 1/2006 | LaChapelle et al. | 707/100 |
| 2006/0141962 | A1 | 6/2006 | Forbes et al. | |
| 2007/0123185 | A1 | 5/2007 | Welk et al. | |
| 2007/0206827 | A1 | 9/2007 | Tupman et al. | |
| 2007/0266252 | A1 * | 11/2007 | Davis et al. | 713/176 |
| 2007/0288478 | A1 | 12/2007 | DiMaria et al. | |
| 2008/0082510 | A1 * | 4/2008 | Wang et al. | 707/3 |
| 2009/0024592 | A1 * | 1/2009 | Lazarski et al. | 707/3 |
| 2010/0131567 | A1 * | 5/2010 | Dorogusker et al. | 707/802 |

OTHER PUBLICATIONS

"ADS Instant FM Music Tuner—USB 2.0", Retrieved on Jul. 28, 2008, 7 pages. http://www.tigerdirect.com/applications/searchtools/item-details.asp?EdpNo=2536543.

"Sony Ericsson Announced Four New Mobile Phones", May 19, 2006, 6 pages. http://ph.hardwarezone.com/news/view.php?id=4564&cid=9&pg=3.

* cited by examiner

OBTAINING AND PRESENTING METADATA RELATED TO A RADIO BROADCAST

BACKGROUND

Radio listeners may desire to learn more about music they hear on the radio. For this purpose, radio broadcasts sometimes include radio data system (RDS) data, which can contain, for example, a text string that can be scrolled across a display of a radio receiver. The text string may inform the listener of the genre of the music, or call letters of the radio station, for example.

However, one drawback of RDS data is that only text data is communicated to the radio receiver, which is not particularly impactful to listeners. As a result, listeners may not be fully informed of the music they are listening to, which may result in a disinterested or frustrated listener. As a result, listenership may decline and/or potential sales of music may be lost.

SUMMARY

A system and method for presenting content related to a radio broadcast are provided. The system may include a radio device having a receiver configured to receive a radio signal including an audio component and digitally encoded data associated with the audio component. The radio device may further include a decoder configured to decode the digitally encoded data from the radio signal. The radio device may further include a processor configured to receive the digitally encoded data from the decoder, extract a data parameter from the digitally encoded data, send a search query including the data parameter to a content service, and receive from the content service displayable metadata associated with the data parameter. The system may further include a display configured to display the metadata received from the content service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
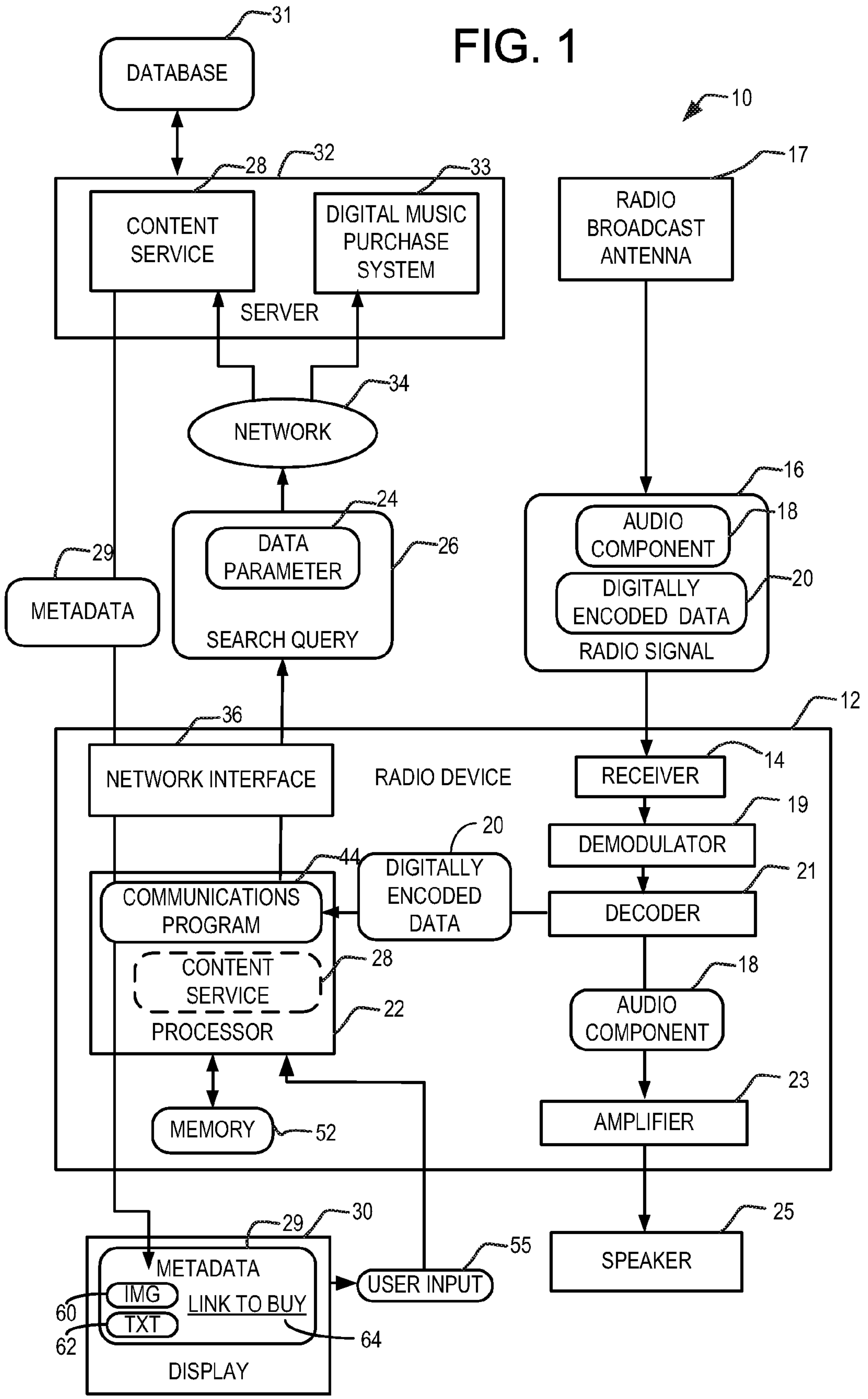
FIG. 1 is a schematic view of an embodiment of a system for presenting content related to a radio broadcast.

FIG. 1 illustrates a system 10 for presenting content related to a radio broadcast. System 10 may include a radio device 12 having a receiver 14 configured to receive a radio signal 16, such as a frequency modulation (FM) radio signal, which is transmitted from a radio broadcast antenna 17. Alternatively, the radio signal 16 may be a satellite or high definition (HD) radio signal.

The radio signal 16 may include an audio component 18 and digitally encoded data 20 associated with an audio track that is being broadcast via the audio component 18. The digitally encoded data 20 may be in a variety of formats, for example, radio data system (RDS) data, radio text plus (RT+) data, etc. The radio signal 16 may be received by a receiver 14 and then passed through a demodulator 19, which may be configured to demodulate the modulated radio signal 16. The radio signal 16 may further be passed to a decoder 21, which is configured to extract the digitally encoded data 20 and the audio component 18 from the demodulated radio signal. In one embodiment, the digitally encoded data may be digitally encoded RDS data. The audio component 18 is passed through an amplifier 23, and amplified for playback via speaker 25, while the digitally encoded data 20 is passed to a processor 22 of the radio device 12 for further processing.

Processor 22 is configured to receive the digitally encoded data 20 from the decoder 21, and extract a data parameter 24 from the digitally encoded data 20. In one embodiment, the data parameter 24 may be an RDS data parameter. The processor 22 may further be configured to send a search query 26 including the data parameter 24 to a content service 28. These and the various other processor functions described herein may be carried out by a communications program 44 executed by the processor 22 using portions of memory 52.

The content service 28, in turn, may be configured to receive the search query 26, including the data parameter 24, which constitutes a request for metadata 29 associated with the audio track played on from the radio device 12. The content service may further be configured to search a content catalog stored on a database 31 for metadata associated with the audio track, select metadata 29 related to the search query from the content catalog, and serve the selected metadata 29 to the radio device 12 for downstream presentation to a user.

The processor 22 may be configured to receive from the content service 28 the displayable metadata 29 associated with the data parameter 24, and send an instruction to a display 30 to display the metadata, for example while the audio component is playing through the speaker. The displayable metadata is configured to be visually displayed on display 30. The display 30, in turn, is configured to display the metadata 29 received from the content service 28. In this manner, a user may be presented with metadata 29 retrieved from the content service 28 that is related to the audio component 18, for example while the audio component 18 is being played through speaker 25. In some examples, the metadata may be retained for later viewing on the display 30, even after the audio track has finished playing.

It will be appreciated that the data parameter 24 may be virtually any suitable parameter, such as a parameter selected from the digitally encoded data 20. For example, the data parameter 24 may be a data parameter indicating station call sign, program type, or radio text. Several types of radio text may be defined in the digitally encoded data. For example, the radio text may include strings indicating track related data, such as track title, album, track number, artist, composition, conductor, composer, band, track comment, genre, and a content identifier. In this manner, the search query 26 generated by the processor 22 may include a rich variety of information, which in turn can be used by the content service 28 to locate meaningful and appropriate related metadata 29 in database 31.

In one example, the data parameter 24 may be extracted from a digital sample of a portion of the audio track that is contained in the audio component of the radio signal. For example, the data parameter may be a digital signature, such as a digital signature of a hash, and may be extracted from the digital sample. In this embodiment, the hash may be matched by the content service against a known database of songs and hashes to identify relevant metadata for download and display on the radio device.

The following is an example query format for the search query 26 that may be sent from the radio device 12 to the content service 28. PS, PTY, and RT are values defined by the RDS specification. PS is an 8 character string that is configured to scroll across the radio display of the radio device. PTY is genre information. RT (radio text) is a longer string of text transmitted by radio stations. The fields named ITEM.* and IDENTIFIER are values from the RT+ specification, which extends the RDS specification. In this embodiment, parameters marked with brackets are optional.

Query Format

```
{URL_query_endpoint}radio&radioBand={band}&frequency=
{frequency}&callsign={PS}&timestamp={timestamp}
&programType={PTY}&radioText={RT}[&title={ITEM.TITLE}]
[&album={ITEM.ALBUM }][&trackNumber=
{ITEM.TRACKNUMBER}][&artist={ITEM.ARTIST}][&composition=
{ITEM.COMPOSITION}][&movement={ITEM.MOVEMENT}]
[&conductor={ITEM.CONDUCTOR}][&composer=
{ITEM.COMPOSER}][&band={ITEM.BAND}][&comment=
{ITEM.COMMENT}][&genre={ITEM.GENRE}][&isrc={IDENTIFIER}]
```

The following is an example Query URL that might be formed according to the above query format, which includes, among other data parameters, the artist name (Johnny Cash), track name (Man in Black), and radio station call letters (KMPS). It will be appreciated that this is merely one example and wide variety of other possibilities exist.

URL Format http://{url_query_endpoint}/track?radio&radioBand=FM&frequency=94.1&callsign=KMPS&timestamp=8%2f15%2f2008+9%3a30%3a45+PM&programType=Country&radioText=Now+Playing+Johnny+Cash+Man+in+Black+on+KMPS&artist=Johnny+Cash&title=Man+in+Black The content service 28 may be executed on a server 32 in communication with the radio device 12 via a network 34, which may be a wide area network such as the Internet or a local area network, for example. Further, it will be appreciated that a network interface 36 may be provided on the radio device 12 to enable the device to communicate with the server 32 via the computer network 34. Alternatively, the content service 28 may be executed by the processor 22 of the radio device 12. For example, the radio device 12 may be a portable computing device equipped with an FM receiver, and the content service 28 may be at least partially locally executed on the portable computing device. As another example, the radio device may be mounted in a vehicle, and network 34 may be an in-vehicle local area network. In such a deployment, the content service may be executed by a device such as a local server, which is connected to the radio device by the in-vehicle local area network.

The displayable metadata 29 may include a wide variety of content. For example, the displayable metadata may include album art, artist biographies, track length, track reviews, music catalog navigation, related artists, videos, information on related songs, and/or a link to purchase a digital copy of the track. This metadata may include one or more of several different data types. For example, it will be appreciated that the album art may include an image, video or animation file; the artist biographies, track length, track reviews, and related artists may be text or rich text data; the music catalog navigation may include hyperlinks to related songs and related artists; and the link to purchase a digital copy may include a hyperlink to a digital music purchase system. This metadata may be formatted as structured data, such as XML, which can be interpreted by the processor and rendered on the display device. In FIG. 1, an example is shown depicting metadata 29 including an image 60 and text 62, as well as associated purchase mechanism 64 in the form of a hyperlink to purchase a copy of the audio track associated with the metadata. Typically, the metadata does not include an audio data for the track contained in the audio component of the radio signal. Rather, the metadata may include displayable data as described above, which in some embodiments may include a link to purchase a digital copy of the track.

To enable a user to choose the types of metadata that are displayed on the radio device, the processor 22 may be configured to receive a user selection 55 of selected metadata types to be displayed on the radio device, and instruct the display to present the selected metadata types. In this manner, unwanted display of metadata may be avoided, enhancing the user experience. With regard to the manner of user input 55, the radio device may include a touch screen, for example, and the user selection may be made via the touch screen, as illustrated in FIG. 1. Alternatively, the user selection may be made via another user input device associated with the radio device 12, such as a buttons, mouse, keyboard, etc.

Following the downloading and display of metadata 29 on display 30, it will be appreciated that a user may desire to purchase a copy of the audio track via the purchase mechanism 64. Thus, the processor may be configured to receive a request to purchase a digital copy of the track via the purchase mechanism 64 included in the metadata. The processor may forward the request to a digital music purchase system 33, which may be executed on the same or a different server 32 as the content service. The digital music purchase system in turn is configured to receive a request to purchase a digital copy of the track, to process the request to purchase, and to serve a purchased copy of the track to the radio device. The purchased copy may be stored in non-volatile portions of memory 52 or alternatively on a mass storage device, for later playback.

Figure 2:
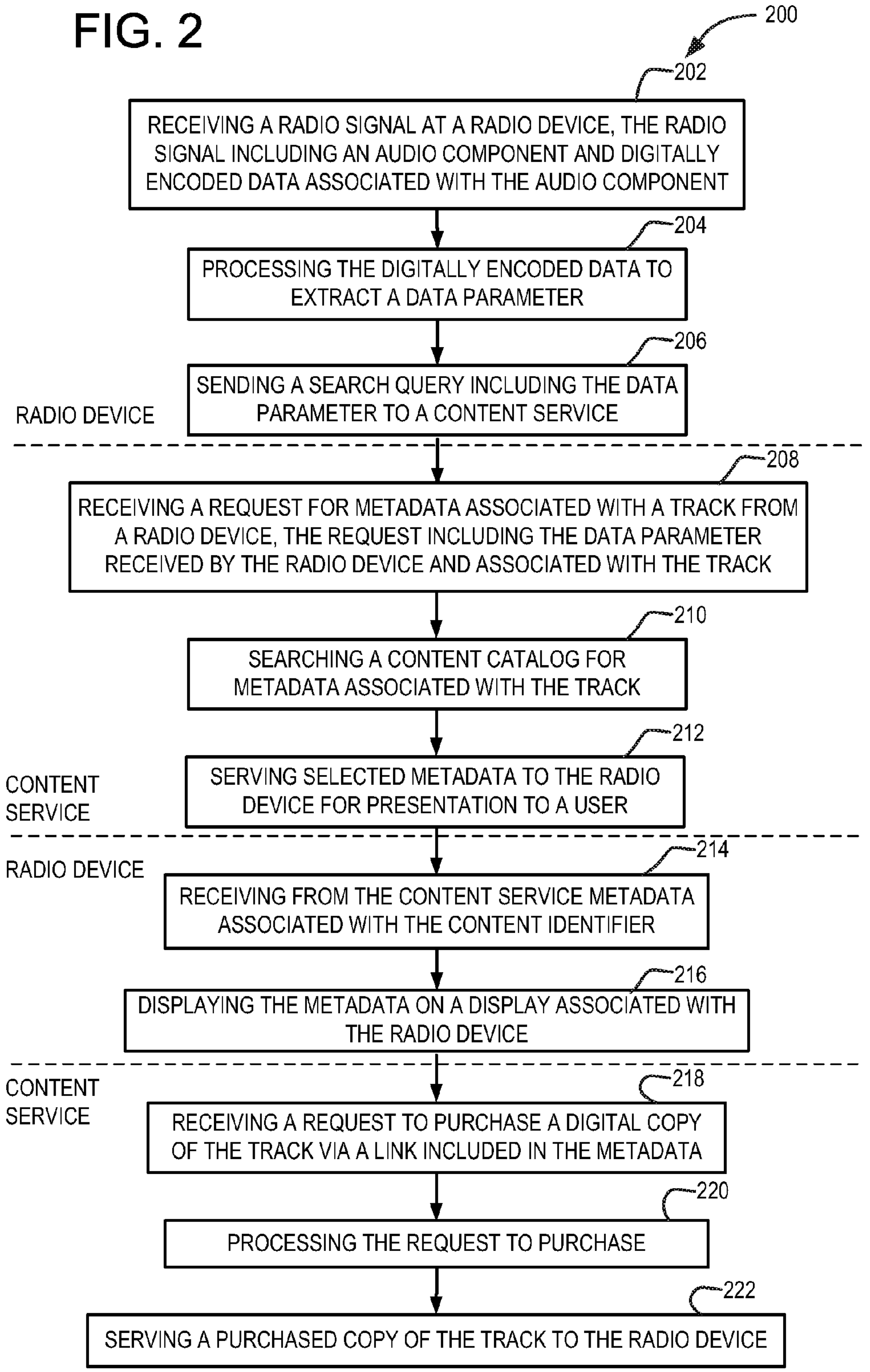
FIG. 2 is a flowchart illustrating an embodiment of a method for presenting content related to a radio broadcast.

FIG. 2 illustrates a method 200 of presenting content related to a radio broadcast. It will be appreciated that method 200 may be implemented using the hardware and software described above, or via other suitable hardware and software. Method 200 may include, at 202, receiving a radio signal at a radio device. The radio signal may include an audio component and digitally encoded data associated with the audio component. As described above, in some embodiments, the digitally encoded data may be radio data system (RDS) data. At 204, the method may further include processing the digitally encoded data, on the radio device, to extract a data parameter. In some embodiments the extracted data parameter may be an RDS data parameter. At 206, the method may further include sending a search query including the data parameter to a content service. It will be appreciated that steps 202-206 are typically performed at a radio device, such as described above.

At 208, the method may include receiving a request for metadata associated with a track from a radio device, the request including a data parameter (such as an RDS data parameter) received by the radio device and associated with the track. At 210, the method may include searching a content catalog for metadata associated with the track. At 212, the method may include serving selected metadata from the content service to the radio device for presentation to a user. It will be appreciated that steps 208-212 are typically performed at the content service, and accomplish the function of serving content to the radio device.

At 214, the method may include receiving the metadata associated with the content identifier from the content service, at the radio device. At 216, the method may include displaying the metadata on a display associated with the radio device.

Method 200 may include, at 218, receiving a request to purchase a digital copy of the track via a purchase mechanism, such as a hyperlink, included in the metadata. At 220, the method may include processing the request to purchase. At 222, the method may include serving a purchased copy of the track to the radio device to the radio device.

The radio signal of method 200 may be a frequency modulation (FM) radio signal. Alternatively, a satellite or high definition (HD) radio signal may be used. As described above, the data parameter may indicate a station call sign, program type, and radio text. The radio text, for example, may include strings indicating track related data selected from the group including track title, album, track number, artist, composition, conductor, composer, band, track comment, genre, and a content identifier.

It will be appreciated that the content service of method 200 may be executed on a server in communication with the radio device via a computer network. Alternatively, the content service may be executed by the radio device or a device connected to the radio device by a local area network.

It will further be appreciated that the metadata of method 200 may be data indicating album art, artist biographies, track length, track reviews, music catalog navigation, related artists, related songs, and a link to purchase a digital copy of the track. Other forms of metadata may also be utilized. Typically, the metadata does not include an audio data for the track contained in the audio component of the radio signal. Rather, the metadata may include displayable data as described above, which in some embodiments may include a link to purchase a digital copy of the track.

Figure 3:
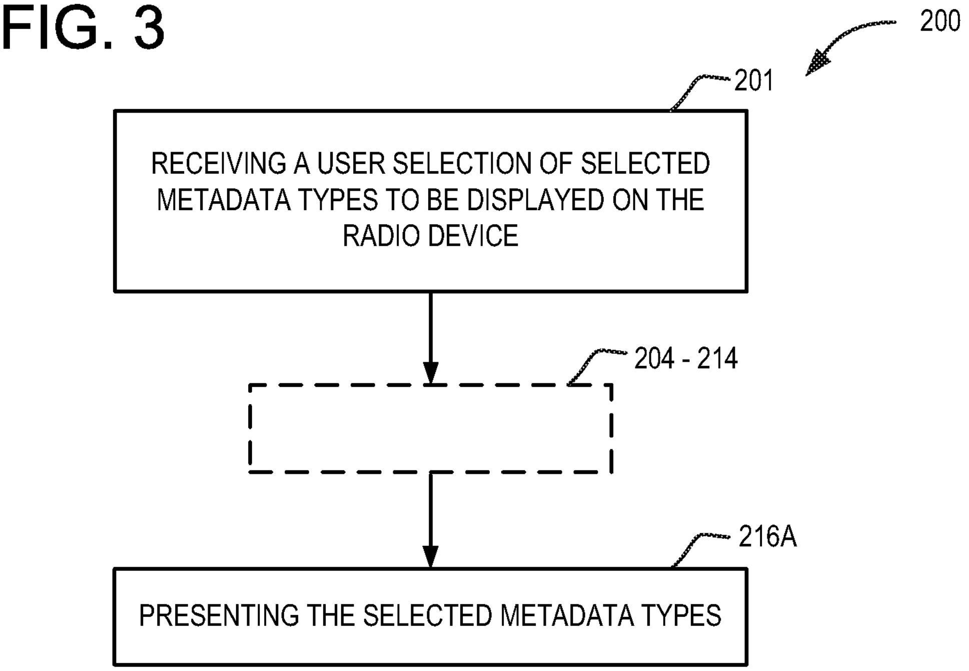
FIG. 3 is a flowchart of a variation of the method of FIG. 2.

As illustrated in FIG. 3, method 200 may include, at 201, receiving a user selection of selected metadata types to be displayed on the radio device. Further, presenting the metadata at 216 may include, as indicated at 216A, presenting the selected metadata types, for example, by displaying the selected metadata on a display. In this manner, a user may selectively filter the types of metadata that are presented, to avoid any unwanted presentation of metadata.

The above described systems and methods may be used by a radio device to download and display rich content to a listener, using digitally encoded data that is extracted from the radio broadcast signal. In this manner, users may obtain more information about a broadcast radio track, and in some cases, purchase a copy of the track.

It will be appreciated that the radio device described herein may be any suitable radio device configured with a radio receiver, and a processor configured to execute the programs described herein. For example, the radio device may be a mainframe computer, personal computer, networked computing device, portable electronic device such as a laptop computer, portable data assistant (PDA), computer-enabled wireless telephone, or other suitable computing device equipped with a radio receiver, and may be connected to other devices via computer networks, such as the Internet. The radio device typically includes a processor and associated volatile and non-volatile memory, and is configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for presenting content related to a radio broadcast, comprising a radio device including:

a receiver configured to receive a radio signal including an audio component and digitally encoded data associated with the audio component;

a decoder configured to decode the digitally encoded data from the radio signal; and a processor configured to receive the digitally encoded data from the decoder, extract a data parameter from the digitally encoded data, send a search query including the data parameter to a content service, receive from the content service displayable metadata associated with the data parameter, receive a user selection of selected metadata types to be displayed on the radio device, and instruct a display to present the selected metadata types, the display configured to display the selected metadata types received from the content service, wherein the content service is executed on a server in communication with the radio device via a wide are network, and the metadata is selected from the group consisting of album art, artist biographies, track length, track reviews, music catalog navigation, related artists, related songs, and a link to purchase a digital copy of a track.

2. The system of claim 1, wherein the radio signal is a frequency modulation (FM) radio signal, the digitally encoded data is digitally encoded radio data system (RDS) data, and the data parameter is an RDS data parameter.

3. The system of claim 2, wherein the RDS data parameter is selected from the group consisting of station call sign, program type, and radio text.

4. The system of claim 3, wherein the radio text includes strings indicating track related data, the strings being selected from the group consisting of track title, album, track number, artist, composition, conductor, composer, band, track comment, genre, and a content identifier.

5. The system of claim 1, wherein the radio device is a portable electronic device including a touch screen.

6. A method of presenting content related to a radio broadcast, comprising:

receiving a radio signal at a radio device, the radio signal including an audio component and digitally encoded data associated with the audio component;

processing the digitally encoded data to extract a data parameter;

sending a search query including the data parameter to a content service executed on a server in communication with the radio device via a wide area network;

receiving from the content service displayable metadata associated with the data parameter, wherein the metadata is selected from the group consisting of album art, artist biographies, track length, track reviews, music catalog navigation, related artists, related songs, and a purchase mechanism to purchase a digital copy of a track;

receiving a user selection of selected metadata types to be displayed on the radio device, and displaying the selected metadata types received from the content service on a display associated with the radio device.

7. The method of claim 6, wherein the radio signal is a frequency modulation (FM) radio signal, the digitally encoded data is digitally encoded radio data system (RDS) data, and the data parameter is an RDS data parameter.

8. The method of claim 7, wherein the RDS data parameter is selected from the group consisting of station call sign, program type, and radio text.

9. The method of claim 8, wherein the radio text includes strings indicating data related to the audio component, the data being selected from the group consisting of track title, album, track number, artist, composition, conductor, composer, band, track comment, genre, and a content identifier.

10. The method of claim 6, wherein the data parameter is a digital signature of a hash extracted from a digital sample of a portion of the audio track that is contained in the audio component of the radio signal.

11. A method of serving content to a radio device, comprising, at a content server in communication with the radio device via a wide are network:

receiving a request for metadata associated with an audio track from a radio device via the wide are network, the request including a radio data system (RDS) data parameter received and extracted by the radio device and associated with the track;

searching a content catalog for metadata associated with the track;

in response to the request, serving selected metadata including a purchase mechanism to the radio device for presentation to a user, the radio device being configured to receive a user selection of selected metadata types to be displayed on the radio device;

receiving a request to purchase a digital copy of the track via a purchase mechanism included in the metadata;

processing the request to purchase; and serving a purchased copy of the track to the radio device;

wherein the metadata is selected from the group consisting of album art, artist biographies, track length, track reviews, music catalog navigation, related artists, related songs, and a purchase mechanism to purchase a digital copy of the track.

* * * * *